(12) United States Patent
Moyal et al.

(10) Patent No.: US 12,265,362 B2
(45) Date of Patent: Apr. 1, 2025

(54) BOUNDARY CONTROL OF AN AI SYSTEM BASED ON ENVIRONMENTAL CONTEXT

(71) Applicant: INTERNATIONAL BUSINESS MACHINES CORPORATION, Armonk, NY (US)

(72) Inventors: Shailendra Moyal, Pune (IN); Akash U. Dhoot, Pune (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 329 days.

(21) Appl. No.: 17/664,064

(22) Filed: May 19, 2022

(65) Prior Publication Data
US 2023/0375985 A1    Nov. 23, 2023

(51) Int. Cl.
G05B 13/02    (2006.01)
G16Y 40/30    (2020.01)

(52) U.S. Cl.
CPC .......... G05B 13/0265 (2013.01); G16Y 40/30 (2020.01)

(58) Field of Classification Search
None
See application file for complete search history.

(56) References Cited

U.S. PATENT DOCUMENTS

| | | | |
|---|---|---|---|
| 7,870,136 B1 * | 1/2011 | Cohen | G06F 18/2321 706/45 |
| 2012/0041979 A1 * | 2/2012 | Lee | G06N 5/022 707/E17.014 |
| 2016/0098646 A1 * | 4/2016 | Gomez | G06N 7/01 706/12 |
| 2020/0036827 A1 * | 1/2020 | Choi | H04M 1/72403 |
| 2020/0380405 A1 | 12/2020 | Trim | |
| 2022/0147934 A1 * | 5/2022 | Chandrashekar | G06F 40/20 |

OTHER PUBLICATIONS

Schilit et al., "Context-Aware Computing Applications", 1995, IEEE, pp. 85-89 (Year: 1995).*

(Continued)

*Primary Examiner* — David Earl Ogg
(74) *Attorney, Agent, or Firm* — Robert R. Aragona

(57) ABSTRACT

An embodiment for controlling a boundary of an AI system based on an environmental context is provided. The embodiment may include receiving data input from one or more sources. The embodiment may also include identifying one or more contextual situations in a surrounding environment. The embodiment may further include identifying one or more input data collection boundaries and a span of control boundary for an AI-enabled device. The embodiment may also include connecting the AI-enabled device to one or more data generation modules within the one or more input data collection boundaries. The embodiment may further include in response to determining none of the one or more data generation modules are unable to connect, identifying an action to be performed by the AI-enabled device. The embodiment may also include executing the action in a first set of one or more machines within the span of control boundary.

17 Claims, 7 Drawing Sheets

(56) References Cited

OTHER PUBLICATIONS

Anonymous, "Method and System for Identified Boundary Condition-Based AI Voice Assistance System to Dynamically Generate a Voice Menu", Dec. 2021, IP.com, pp. 1-6 (Year: 2021).*

Disclosed Anonymously, "Method and System for Identified Boundary Condition-Based AI Voice Assistance System to Dynamically Generate a Voice Menu", IP.com, IPCOM000268143D, Dec. 30, 2021, 6 pages. https://priorart.ip.com/IPCOM/000268143.

Mell et al., "The NIST Definition of Cloud Computing", Recommendations of the National Institute of Standards and Technology, NIST Special Publication 800-145, Sep. 2011, 7 pages.

Tegen, et al., "Activity recognition through interactive machine learning in a dynamic sensor setting", Springer Nature, Personal and Ubiquitous Computing, Jun. 9, 2020, 15 pages. https://doi.org/10.1007/s00779-020-01414-2.

* cited by examiner

BOUNDARY CONTROL OF AN AI SYSTEM BASED ON ENVIRONMENTAL CONTEXT

BACKGROUND

The present invention relates generally to the field of computing, and more particularly to a system for controlling a boundary of an AI system based on an environmental context.

Artificial Intelligence (AI) refers to the simulation of human intelligence in machines that are programmed to think like humans and mimic the actions of humans. In recent years, AI research and development has been primarily concerned with building smart machines capable of performing tasks that previously required some degree of human intelligence. In any AI-enabled surrounding environment, an AI system receives input from a plurality of devices within the environment. In response to receiving this input, the AI system may execute one or more AI operations. These AI operations may include automation of certain tasks, controlling one or more devices, and/or execution of a workflow.

SUMMARY

According to one embodiment, a method, computer system, and computer program product for controlling a boundary of an AI system based on an environmental context is provided. The embodiment may include receiving data input from one or more sources in a surrounding environment. The embodiment may also include identifying one or more contextual situations in the surrounding environment based on the data input. The embodiment may further include identifying one or more input data collection boundaries and a span of control boundary for an AI-enabled device based on the one or more contextual situations. The embodiment may also include connecting the AI-enabled device to one or more data generation modules within the one or more input data collection boundaries. The embodiment may further include in response to determining none of the one or more data generation modules are unable to connect, identifying an action to be performed by the AI-enabled device based on input from the one or more data generation modules. The embodiment may also include executing the action in a first set of one or more machines within the span of control boundary.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
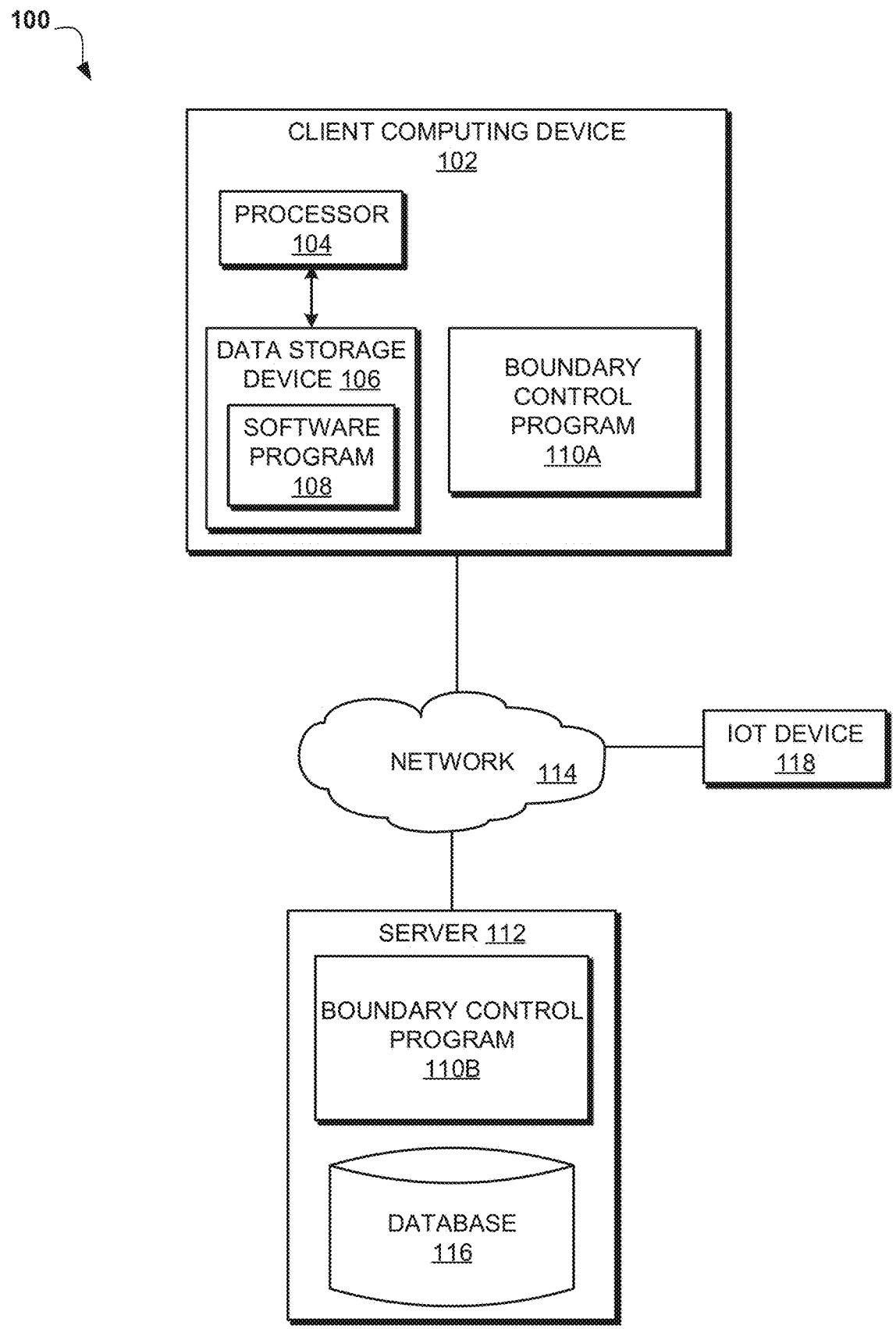
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for controlling a boundary of an Artificial Intelligence (AI) system based on an environmental context. The following described exemplary embodiments provide a system, method, and program product to, among other things, identify one or more input data collection boundaries and a span of control boundary of an AI-enabled device based on one or more contextual situations and, accordingly, execute an action in one or more machines within the span of control boundary. Therefore, the present embodiment has the capacity to improve AI technology by dynamically adjusting a span of control boundary of an AI-enabled device in accordance with the contextual situation.

As previously described, Artificial Intelligence (AI) refers to the simulation of human intelligence in machines that are programmed to think like humans and mimic the actions of humans. In recent years, AI research and development has been primarily concerned with building smart machines capable of performing tasks that previously required some degree of human intelligence. In any AI-enabled surrounding environment, an AI system receives input from a plurality of devices within the environment. In response to receiving this input, the AI system may execute one or more AI operations. These AI operations may include automation of certain tasks, controlling one or more devices, and/or execution of a workflow. For different scenarios, the boundary for gathering data and the boundary for controlling various machines may be different. This problem is typically addressed by expanding the control boundary and the data gathering boundary to include all machines and data generation modules in the surrounding environment. However, too large of a control boundary and a data gathering boundary may result in unnecessary data being input in the AI-enabled device, which can cause the AI-enabled device to execute an incorrect action.

It may therefore be imperative to have a system in place to dynamically change a span of control boundary of an AI-enabled device based on the contextual situation. Thus, embodiments of the present invention may provide advantages including, but not limited to, dynamically changing a span of control boundary of an AI-enabled device based on the contextual situation, preventing an AI-enabled device from executing an incorrect action, and connecting the AI-enabled device to the proper data generation modules to avoid the input of unnecessary data. The present invention does not require that all advantages need to be incorporated into every embodiment of the invention.

According to at least one embodiment, when machines are interacting with an AI system, data input from one or more sources in a surrounding environment may be received in order to identify one or more contextual situations in the surrounding environment based on the data input. Upon identifying the one or more contextual situations, one or more input data collection boundaries and a span of control boundary for an AI-enabled device may be identified based on the one or more contextual situations so that the AI-enabled device may be connected to one or more data generations modules within the one or more input data collection boundaries. According to at least one embodiment, in response to determining none of the one or more data generation modules are unable to connect, an action to be performed by the AI-enabled device may be identified based on input from the one or more data generation modules. The action may then be executed in a first set of one or more machines within the span of control boundary.

According to at least one other embodiment, in response to determining at least one of the one or more data generation modules are unable to connect, the action to be performed by the AI-enabled device may be identified based on historical data relating to a prior action taken during a past related contextual situation such that the span of control boundary may be expanded to include a second set of one or more machines controlled during the past related contextual situation. Upon identifying the action to be performed, the action may then be executed in the second set of the one or more machines within the expanded span of control boundary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify one or more input data collection boundaries and a span of control boundary of an AI-enabled device based on one or more contextual situations and, accordingly, execute an action in one or more machines within the span of control boundary.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a boundary control program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a boundary control program 110B and a database 116 and communicating with the client computing device 102 and IoT Device 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a plurality of sensors, a variety of machines within a surrounding environment including, but not limited to, a virtual assistant, a robotic device, industrial equipment, and heavy machinery, and/or any other IoT Device 118 known in the art for executing commands that is capable of connecting to the communication network 114, and transmitting and receiving data with the client computing device 102 and the server 112.

According to the present embodiment, the boundary control program 110A, 110B may be a program capable of receiving data input from one or more sources in a surrounding environment, identifying one or more input data collection boundaries and a span of control boundary of an AI-enabled device based on one or more contextual situations, executing an action in one or more machines within the span of control boundary, dynamically changing the span of control boundary of the AI-enabled device based on the contextual situation, preventing the AI-enabled device from executing an incorrect action, and connecting the AI-enabled device to the proper data generation modules to avoid the input of unnecessary data. The boundary control method is explained in further detail below with respect to FIGS. 2A and 2B.

Figure 2A:
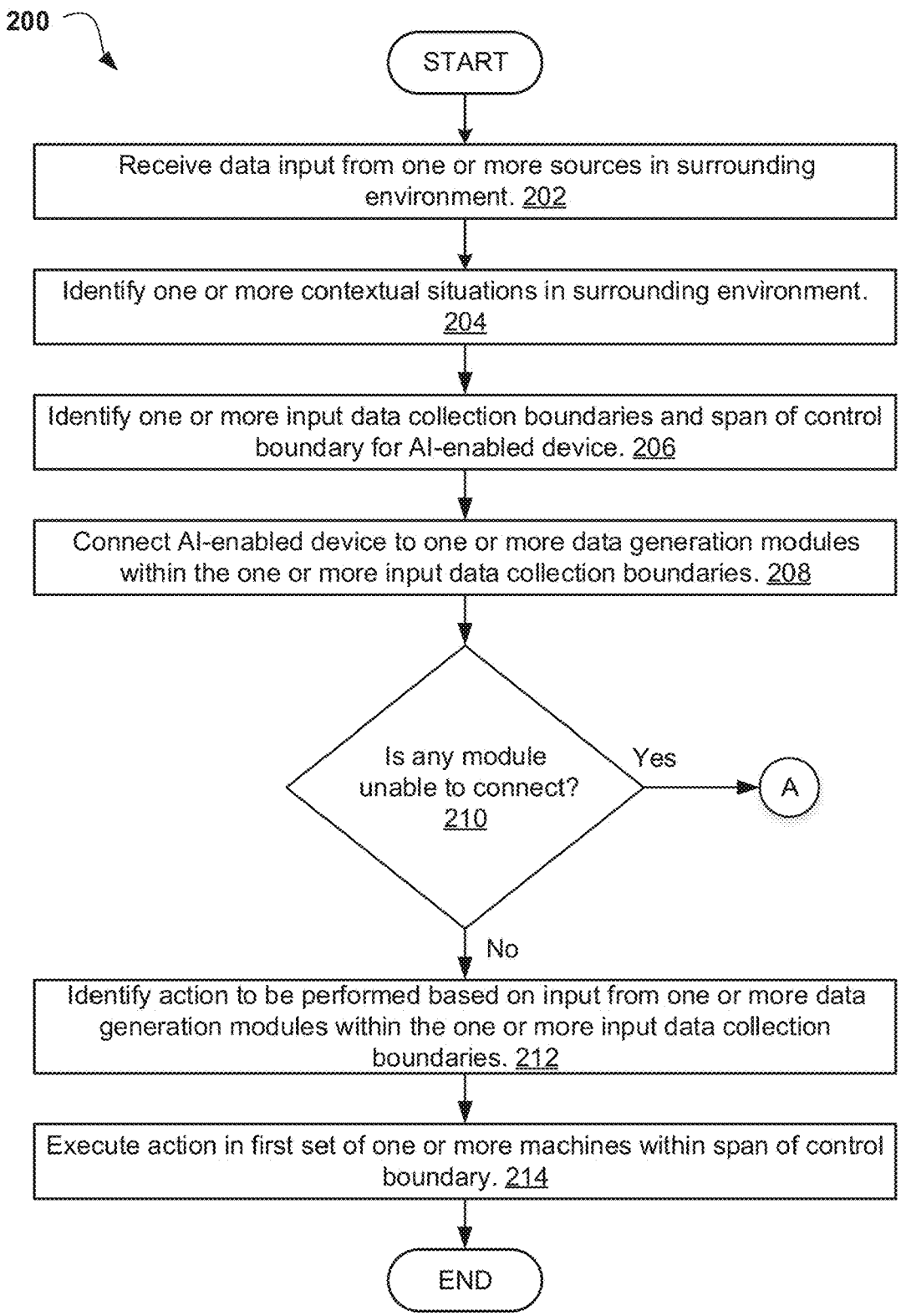
FIGS. 2A and 2B illustrate an operational flowchart for controlling a boundary of an Artificial Intelligence (AI) system based on an environmental context in an AI boundary control process according to at least one embodiment.
Figure 2B:
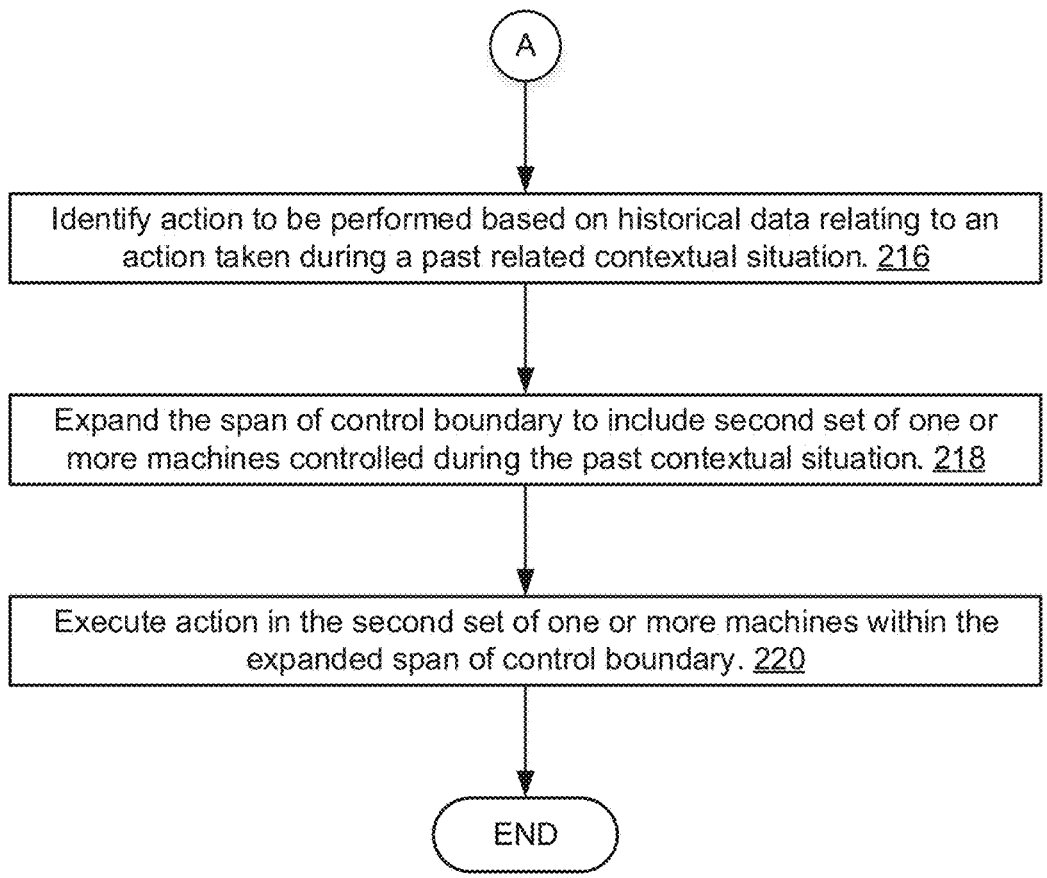

Referring now to FIGS. 2A and 2B, an operational flowchart for controlling a boundary of an AI system based on an environmental context in an AI boundary control process 200 is depicted according to at least one embodiment. At 202, the boundary control program 110A, 110B receives the data input from the one or more sources in the surrounding environment. Examples of a surrounding environment include, but are not limited to, a workshop floor, an industrial complex (e.g., a manufacturing facility), and a construction site. According to at least one embodiment, the source of the data input may be a user. In particular, the source may be questions asked by the user, where the user may be an employee of an organization. For example, the user may ask, "If it's raining outside, which machines will be affected?" According to at least one other embodiment, the source may be feeds from the IoT Device 118, such as a plurality of sensors. Various sensors may exist in the surrounding environment, and each sensor may be placed in a different physical location. These sensors may include, but are not limited to, motion sensors, temperature sensors, pressure sensors, fluid detection sensors, and/or heat sensors. The sensors may transmit data to the boundary control program 110A, 110B to identify the one or more contextual situations, described in further detail below with respect to step 204.

Then, at 204, the boundary control program 110A, 110B identifies the one or more contextual situations in the surrounding environment. The one or more contextual situations are identified based on the data input described above with respect to step 202. The one or more contextual situations may be various influencing factors which trigger the AI-enabled device to execute an action. The AI-enabled device may be any of the client computing devices 102 described above with respect to the description of FIG. 1. Examples of the contextual situation may include, but are not limited to, a fire, a weather condition (e.g., wind, rain, snow, sleet, hail), a leakage (e.g., water, gas, oil, radiation), and/or machine breakdown (e.g., a machine not functioning properly).

According to the at least one embodiment where the source of the data input is questions asked by the user, the contextual situation may be identified based on the question. For example, where the question from the user is, "If it's raining outside, which machines will be affected," the boundary control program 110A, 110B may identify the contextual situation as a weather condition, and in particular rain. In another example, the user may ask, "Is my current location safe if there is a gas leak?" In this example, the boundary control program 110A, 110B may identify the contextual situation as a leakage, and in particular a gas leak. It may be appreciated that the examples described above are not intended to be limiting, and that in embodiments of the present invention a variety of different questions may be asked by the user.

According to the at least one other embodiment where the source of the data input is feeds from the IoT Device 118, such as the plurality of sensors described above with respect to step 202, the contextual situation may be identified based on these feeds. For example, the temperature sensor and/or heat sensor may detect a machine in the surrounding environment is overheating. In this example, the boundary control program 110A, 110B may identify the contextual situation as a machine breakdown, and in particular that the machine is overheating. In another example, the fluid detection sensor may detect a machine in the surrounding environment is leaking oil. In this example, the boundary control program 110A, 110B may identify the contextual situation as a leakage, and in particular an oil leakage. It may be appreciated that the examples described above are not intended to be limiting, and that in embodiments of the present invention a variety of different sensors may be used to detect a variety of other contextual situations.

According to at least one further embodiment, identifying the one or more contextual situations may also include identifying a criticality of the one or more contextual situations. The criticality may be a level of danger associated with each contextual situation. The criticality may be identified by the boundary control program 110A, 110B on a scale. For example, the criticality may be identified as either low, medium, or high. In another example, the criticality may be identified as a numerical scale from 1-5, where "1" indicates a lowest criticality and "5" indicates a highest criticality. The criticality of the one or more contextual situations may be used by the boundary control program 110A, 110B to adjust a coverage area of the one or more input data collection boundaries and the span of control boundary, described in further detail below with respect to step 206.

Next, at 206, the boundary control program 110A, 110B identifies the one or more input data collection boundaries and the span of control boundary for the AI-enabled device. The one or more input data collection boundaries and the span of control boundary are identified based on the one or more contextual situations.

Figure 3:
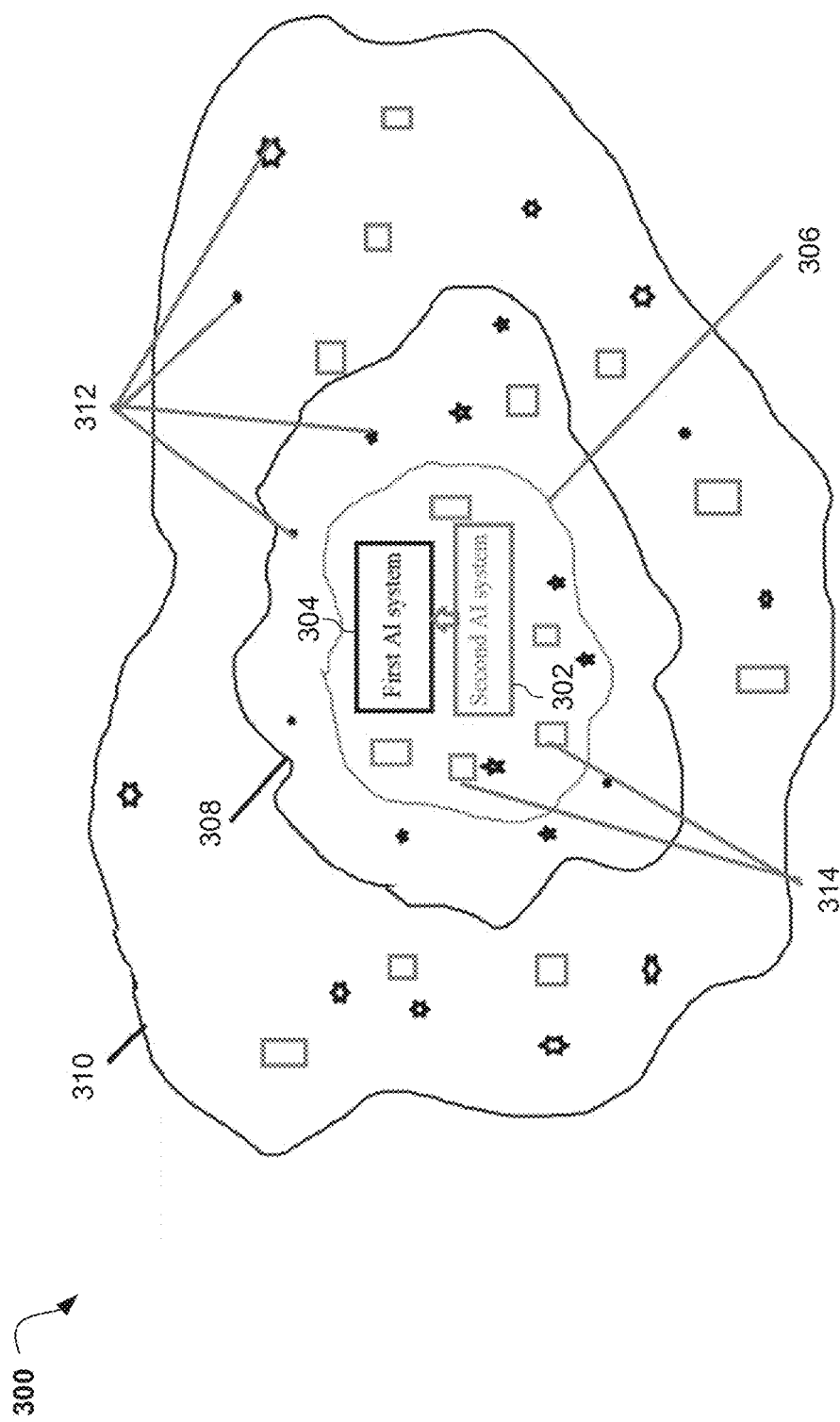
FIG. 3 is an exemplary diagram depicting a designated input data collection boundary and span of control boundary according to at least one embodiment.

The one or more input data collection boundaries, illustrated in FIG. 3, may be one or more coverage areas within the surrounding environment for which the AI-enabled device is accepting input. A separate input data collection boundary may be identified for each contextual situation. For example, a plurality of contextual situations may exist simultaneously, such as a leakage and a weather condition. Any data generation modules, described in further detail below with respect to step 208, outside the physical coverage area of the input data collection boundary may not transmit data to the AI-enabled device for that contextual situation. For example, where "Context A" and "Context B" exist simultaneously, a particular data generation module may be located within the input data collection boundary for "Context B," but may be located outside the input data collection boundary for "Context A." Thus, in this example, the AI-enabled device may receive data from that particular data generation module for "Context B," but may not receive data from that particular data generation module for "Context A."

According to at least one embodiment, as illustrated in FIG. 3, the one or more input data collection boundaries may be overlapping boundaries. For example, the input data collection boundary for "Context B" may encompass all or part of the input data collection boundary for "Context A." According to at least one other embodiment, the one or more input data collection boundaries may be non-overlapping boundaries. For example, the input data collection boundary for "Context B" may be completely physically separate from the input data collection boundary for "Context A."

The span of control boundary, also illustrated in FIG. 3, may be a coverage area within the surrounding environment for which the AI-enabled device is controlling one or more machines, such as by executing an action in the one or more machines. Any machines, described in further detail below with respect to steps 214 and 220, outside the physical coverage area of the span of control boundary may not be controlled by the AI-enabled device. Continuing the example described above where "Context A" and "Context B" exist simultaneously, a particular machine may be located within the span of control boundary and another machine may be located outside the span of control boundary. Thus, in this example, the AI-enabled device may control the particular machine located within the span of control boundary, but may not control the other machine located outside the span of control boundary. According to at least one embodiment, as illustrated in FIG. 3, the span of control boundary may cover multiple contextual situations. For example, there may be a single span of control boundary for "Context A" and "Context B." According to at least one other embodiment, a separate span of control boundary may be identified for each contextual situation. In this embodiment, the coverage area of the span of control boundary may be equivalent to the coverage area of the input data collection boundary for that contextual situation. For example, the coverage area of the span of control boundary for "Context A" may equal the coverage area of the input data collection boundary for "Context A."

According to the at least one further embodiment where identifying the one or more contextual situations includes identifying the criticality of the one or more contextual situations, the coverage area of the one or more input data collection boundaries and the span of control boundary may be adjusted based on the criticality. For example, a contextual situation with a higher criticality may result in a larger input data collection boundary and span of control boundary than a contextual situation with a lower criticality. Continuing the example, a fire may be given a criticality of "5," whereas rain or a water leak may be given a criticality of "1." The input data collection boundary and span of control boundary for the fire may be larger than the input data collection boundary and span of control boundary for the rain or water leak.

Then, at 208, the boundary control program 110A, 110B connects the AI-enabled device to the one or more data generation modules within the one or more input data collection boundaries. Examples of the one or more data generation modules may include, but are not limited to, the plurality of sensors described above with respect to step 202 and/or the machines in the surrounding environment. As described above, these machines may include, but are not limited to, a virtual assistant, a robotic device, industrial equipment, and/or heavy machinery. Any data generation modules outside the physical coverage area of the input data collection boundary may not be connected to the AI-enabled device for that contextual situation. For example, where "Context A" and "Context B" exist simultaneously, a particular data generation module may be located within the input data collection boundary for "Context B," but may be located outside the input data collection boundary for "Context A." Thus, in this example, the AI-enabled device may be connected to the particular data generation module for "Context B," but may not be connected to the particular data generation module for "Context A." More specifically, where "Context A" is a weather condition, such as rain, it may not be necessary to connect the AI-enabled device to any data generation modules in an enclosed space, since those data generation modules may not be impacted due to the rain. It may be appreciated that the examples described above are not intended to be limiting, and that in embodiments of the present invention the AI-enabled device may be connected to a variety of other data generation modules within the one or more input data collection boundaries.

Next, at 210, the boundary control program 110A, 110B determines whether any of the one or more data generation modules are unable to connect to the AI-enabled device. A data generation module may be unable to connect due to a variety of different factors. Such factors may include, but are not limited to, damage to the data generation module and/or the data generation module being out of communication range.

In response to determining none of the one or more data generation modules are unable to connect (step 210, "No" branch), the AI boundary control process 200 proceeds to step 212 to identify the action to be performed by the AI-enabled device based on the input from the one or more data generation modules. In response to determining the at least one of the one or more data generation modules are unable to connect (step 210, "Yes" branch), the AI boundary control process 200 proceeds to step 216 to identify the action to be performed by the AI-enabled device based on the historical data relating to the prior action taken during the past related contextual situation.

Then, at 212, the boundary control program 110A, 110B identifies the action to be performed by the AI device based on the input from the one or more data generation modules. The one or more data generation modules may be transmitting data to the AI-enabled device, which may be in communication with the boundary control program 110A, 110B via an application programming interface (API). For example, the one or more data generation modules may be transmitting data to the AI-enabled device indicating that a fire has broken out on the factory floor. In this example, the action to be taken may be to power down any machines within the vicinity of the fire. In another example, the one or more data generation modules may be transmitting data to the AI-enabled device indicating that a machine is leaking a fluid, such as oil or gas. In this example, the action to be taken may be to cause a robotic device to close a valve that is supplying the fluid to the machine. It may be appreciated that the examples described above are not intended to be limiting, and that in embodiments of the present invention the action to be performed may include a variety of preventive or mitigation measures.

Next, at 214, the boundary control program 110A, 110B executes the action in the first set of the one or more machines within the span of control boundary. The action may be executed in accordance with the identified action to be performed described above with respect to step 212. Continuing the example described above where the fire has broken out on the factory floor, the action executed may be to power down the first set of the one or more machines within the span of control boundary. Continuing the example described above where the machine is leaking oil or gas, the action executed may be to cause the robotic device to close the valve that is supplying the fluid to the first set of the one or more machines within the span of control boundary.

Then, at 216, the boundary control program 110A, 110B identifies the action to be performed by the AI-enabled device based on the historical data relating to the prior action taken during the past related contextual situation. The boundary control program 110A, 110B may utilize the historical data to create a corpus. The corpus may include, but is not limited to, data relating to the actions taken during any past contextual situations, the span of control boundaries identified for those past contextual situations, the input data collection boundaries for those past contextual situations, and/or machines controlled during those past contextual situations. In particular, the one or more machines controlled during those past contextual situations that are related to the current contextual situation may be included in the second set of the one or more machines, described in further detail below with respect to step 218. The boundary control program 110A, 110B may leverage this corpus when identifying the action to be performed in the current contextual situation. For example, when the prior action taken during a past fire is powering down one or more machines, the action to be performed when another fire breaks out (i.e., a related contextual situation) may be to also power down one or more machines.

Next, at 218, the boundary control program 110A, 110B expands the span of control boundary to include the second set of the one or more machines controlled during the past related contextual situation. The second set of the one or more machines may include at least one machine in common with the first set of the one or more machines. Thus, the coverage area of the span of control boundary in the current contextual situation may equal the coverage area of the span of control boundary in the past related contextual situation. Continuing the example described above where the past related contextual situation is the fire, the boundary control program 110A, 110B may expand the span of control boundary to include the second set of the one or more machines controlled during the past fire.

Then, at 220, the boundary control program 110A, 110B executes the action in the second set of the one or more machines within the expanded span of control boundary. The action may be executed in accordance with the identified action to be performed described above with respect to step 216. Continuing the example described above where the past related contextual situation is the fire, the action executed may be to power down the second set of the one or more machines within the expanded span of control boundary.

Referring now to FIG. 3, an exemplary diagram 300 depicting a designated input data collection boundary and span of control boundary is shown according to at least one embodiment. In the diagram 300, a second AI system 302 (referred to as the boundary control program 110A, 110B in FIGS. 2A and 2B) may interact with a first AI system 304 (referred to as the AI-enabled device in FIGS. 2A and 2B). The second AI system 302 may set the input data collection boundary for "Context A" 308 and the input data collection boundary for "Context B" 310. In the embodiment depicted in FIG. 3, the input data collection boundary for "Context A" 308 and the input data collection boundary for "Context B" 310 are overlapping boundaries. Additionally, in the embodiment depicted in FIG. 3, the span of control boundary 306 covers multiple contextual situations (e.g., "Context A" and "Context B"). Within the input data collection boundary for "Context A" 308, the input data collection boundary for "Context B" 310, and the span of control boundary 306 are a plurality of data generation modules 312 and a plurality of machines 314. The plurality of data generation modules 312 may transmit data to the first AI system 304 such that the first AI system 304 may execute the action in at least one of the plurality of machines 314 within the span of control boundary 306.

It may be appreciated that FIGS. 2A, 2B, and 3 provide only an illustration of one implementation and do not imply any limitations with regard to how different embodiments may be implemented. Many modifications to the depicted environments may be made based on design and implementation requirements.

Figure 4:
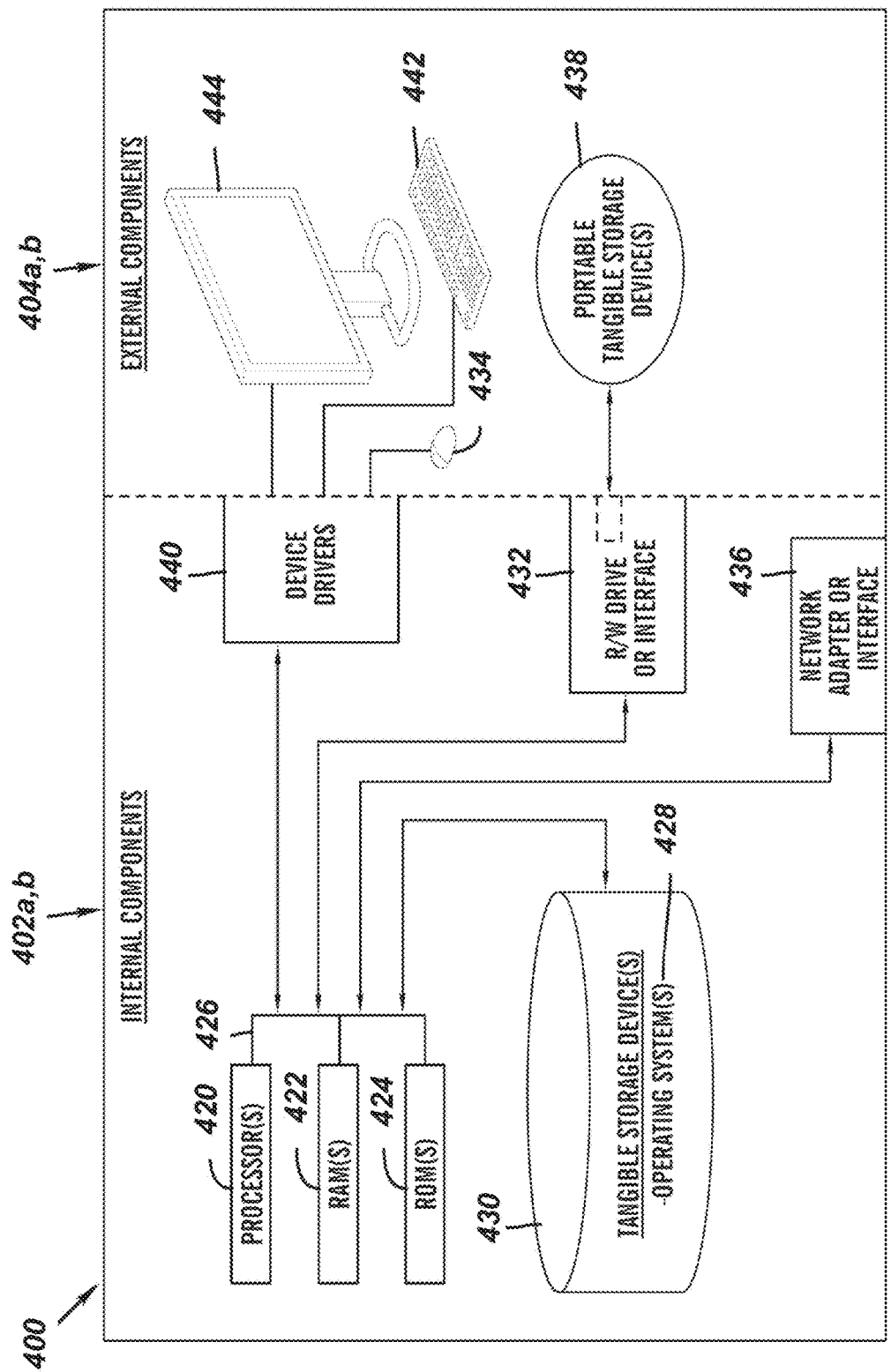
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the boundary control program 110A in the client computing device 102 and the boundary control program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the boundary control program 110A, 110B, can be stored on one or more of the respective portable computer-readable tangible storage devices 438, read via the respective R/W drive or interface 432, and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the boundary control program 110A in the client computing device 102 and the boundary control program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the boundary control program 110A in the client computing device 102 and the boundary control program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
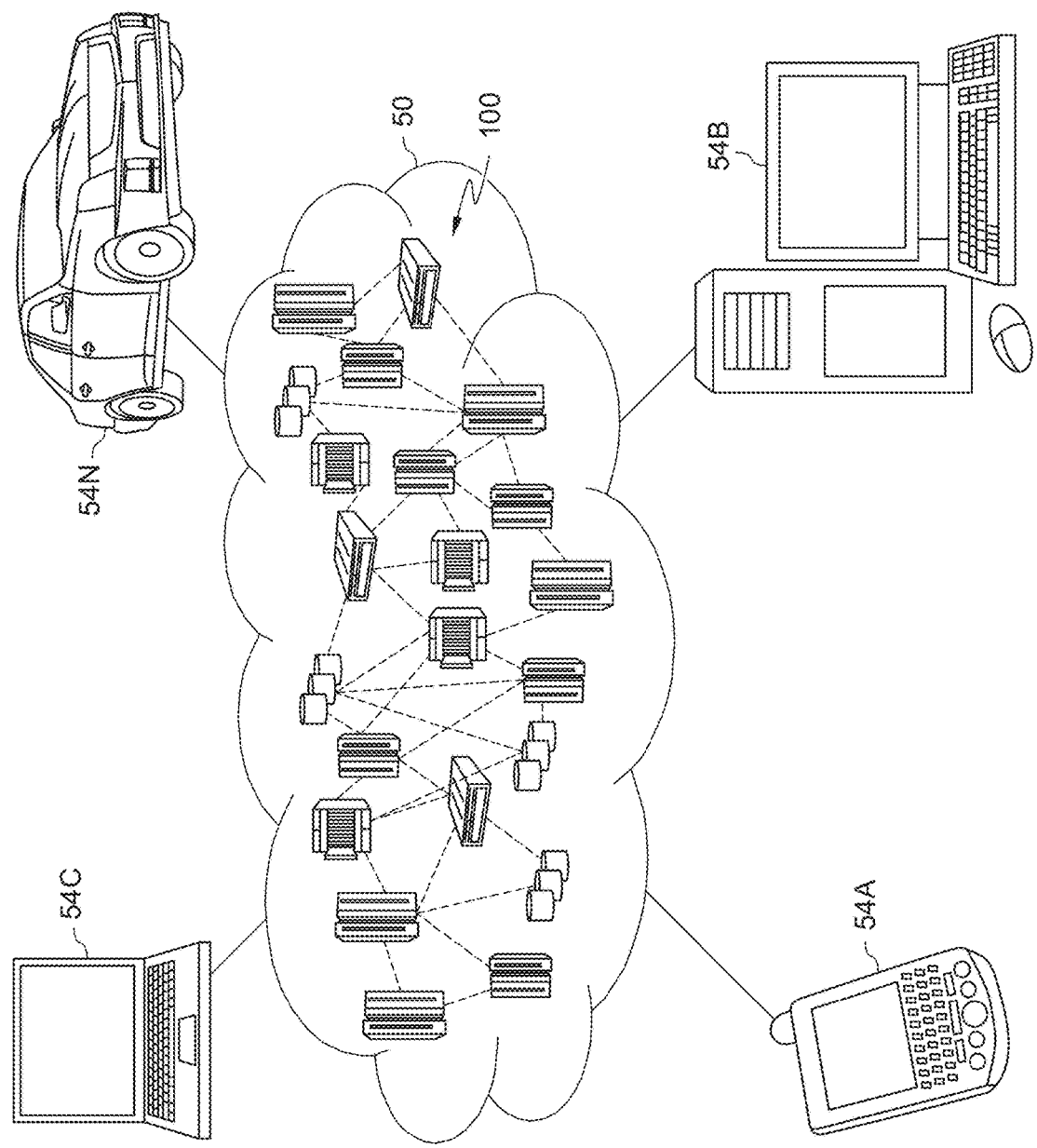
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
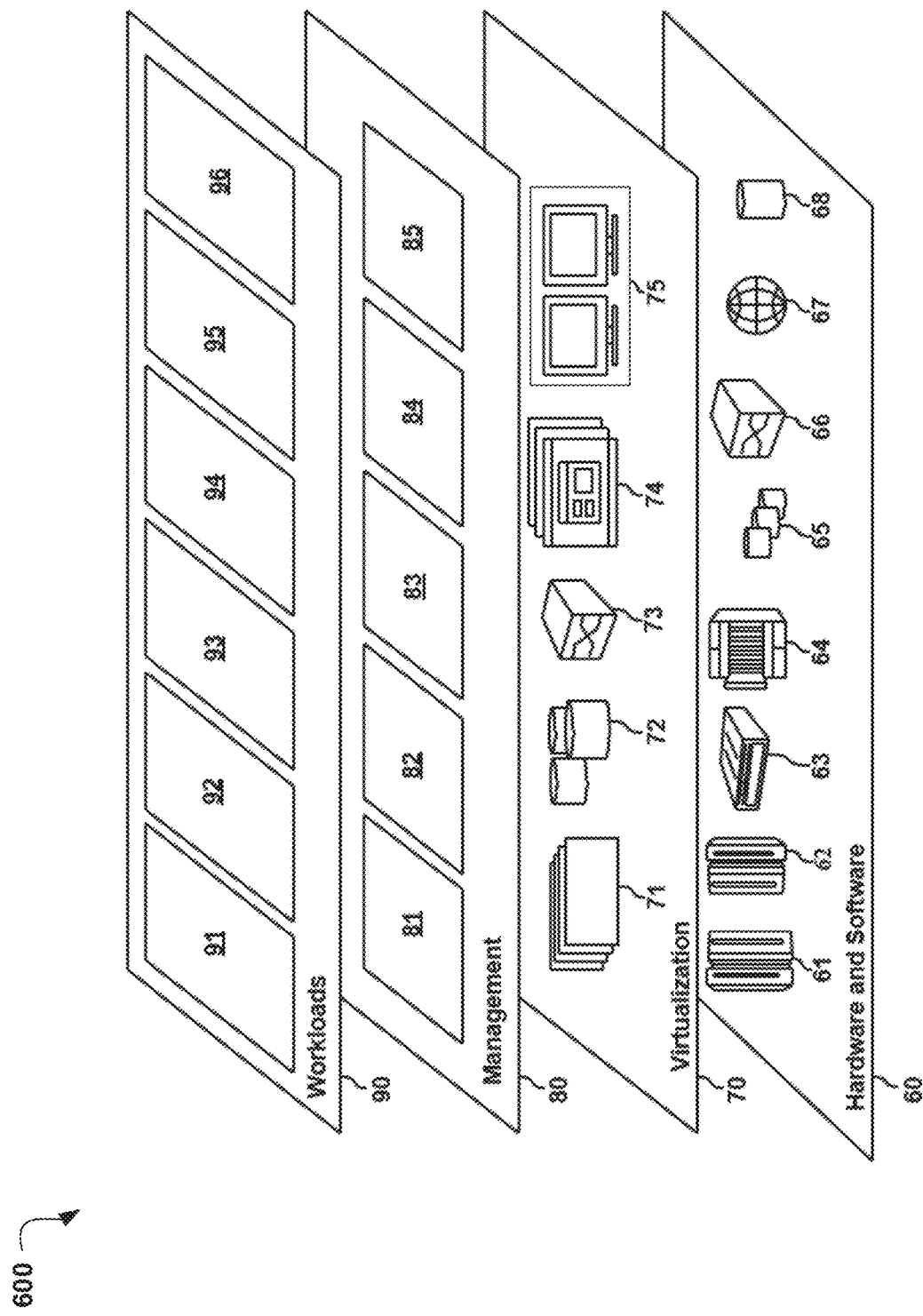
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling a boundary of an AI system based on an environmental context 96. Controlling a boundary of an AI system based on an environmental context 96 may relate to identifying one or more input data collection boundaries and a span of control boundary of an AI-enabled device based on one or more contextual situations in order to execute an action in one or more machines within the span of control boundary.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of controlling a boundary of an artificial intelligence (AI) system, the method comprising:
   receiving data input from one or more sources in a surrounding environment;
   identifying one or more contextual situations in the surrounding environment based on the data input, wherein identifying the one or more contextual situations further comprises identifying a criticality of the one or more contextual situations;
   identifying one or more input data collection boundaries and a span of control boundary for an AI-enabled device based on the one or more contextual situations, wherein a coverage area of the one or more input data collection boundaries and the span of control boundary is adjusted based on the criticality; and
   connecting the AI-enabled device to one or more data generation modules within the one or more input data collection boundaries.

2. The computer-based method of claim 1, further comprising:
   determining whether any of the one or more data generation modules are unable to connect;
   in response to determining none of the one or more data generation modules are unable to connect, identifying an action to be performed by the AI-enabled device based on input from the one or more data generation modules; and
   executing the action in a first set of one or more machines within the span of control boundary.

3. The computer-based method of claim 1, further comprising:
   in response to determining at least one of the one or more data generation modules are unable to connect, identifying the action to be performed by the AI-enabled device based on historical data relating to a prior action taken during a past related contextual situation;
   expanding the span of control boundary to include a second set of one or more machines controlled during the past related contextual situation; and
   executing the action in the second set of the one or more machines within the expanded span of control boundary.

4. The computer-based method of claim 1, wherein the span of control boundary covers multiple contextual situations.

5. The computer-based method of claim 4, wherein the one or more input data collection boundaries are overlapping boundaries.

6. The computer-based method of claim 1, wherein a separate span of control boundary is identified for each contextual situation.

7. A computer system, the computer system comprising:
   one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
   receiving data input from one or more sources in a surrounding environment;
   identifying one or more contextual situations in the surrounding environment based on the data input, wherein identifying the one or more contextual situations further comprises identifying a criticality of the one or more contextual situations;
   identifying one or more input data collection boundaries and a span of control boundary for an AI-enabled device based on the one or more contextual situations, wherein a coverage area of the one or more input data collection boundaries and the span of control boundary is adjusted based on the criticality; and
   connecting the AI-enabled device to one or more data generation modules within the one or more input data collection boundaries.

8. The computer system of claim 7, the method further comprising:
   determining whether any of the one or more data generation modules are unable to connect;
   in response to determining none of the one or more data generation modules are unable to connect, identifying an action to be performed by the AI-enabled device based on input from the one or more data generation modules; and executing the action in a first set of one or more machines within the span of control boundary.

9. The computer system of claim 7, the method further comprising:

in response to determining at least one of the one or more data generation modules are unable to connect, identifying the action to be performed by the AI-enabled device based on historical data relating to a prior action taken during a past related contextual situation;

expanding the span of control boundary to include a second set of one or more machines controlled during the past related contextual situation; and executing the action in the second set of the one or more machines within the expanded span of control boundary.

10. The computer system of claim 7, wherein the span of control boundary covers multiple contextual situations.

11. The computer system of claim 10, wherein the one or more input data collection boundaries are overlapping boundaries.

12. The computer system of claim 7, wherein a separate span of control boundary is identified for each contextual situation.

13. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving data input from one or more sources in a surrounding environment;

identifying one or more contextual situations in the surrounding environment based on the data input, wherein identifying the one or more contextual situations further comprises identifying a criticality of the one or more contextual situations;

identifying one or more input data collection boundaries and a span of control boundary for an AI-enabled device based on the one or more contextual situations, wherein a coverage area of the one or more input data collection boundaries and the span of control boundary is adjusted based on the criticality; and connecting the AI-enabled device to one or more data generation modules within the one or more input data collection boundaries.

14. The computer program product of claim 13, the method further comprising:

determining whether any of the one or more data generation modules are unable to connect;

in response to determining none of the one or more data generation modules are unable to connect, identifying an action to be performed by the AI-enabled device based on input from the one or more data generation modules; and executing the action in a first set of one or more machines within the span of control boundary.

15. The computer program product of claim 13, the method further comprising:

in response to determining at least one of the one or more data generation modules are unable to connect, identifying the action to be performed by the AI-enabled device based on historical data relating to a prior action taken during a past related contextual situation;

expanding the span of control boundary to include a second set of one or more machines controlled during the past related contextual situation; and executing the action in the second set of the one or more machines within the expanded span of control boundary.

16. The computer program product of claim 13, wherein the span of control boundary covers multiple contextual situations.

17. The computer program product of claim 16, wherein the one or more input data collection boundaries are overlapping boundaries.

* * * * *